(12) United States Patent
Kim et al.

(10) Patent No.: US 10,889,503 B2
(45) Date of Patent: Jan. 12, 2021

(54) ZEOLITE HAVING SPECIFIC RATIO OF DIVALENT COPPER IONS SUPPORTED THEREON, AND PREPARATION METHOD THEREFOR AND CATALYST COMPOSITION COMPRISING SAME

(71) Applicant: HEESUNG CATALYSTS CORPORATION, Gyeonggi-do (KR)

(72) Inventors: Mi-young Kim, Gyeonggi-do (KR); Jin-won Kim, Gyeonggi-do (KR); Yong Sul Kim, Gyeonggi-do (KR); Eun-seok Kim, Gyeonggi-do (KR); Seung Chul Na, Gyeonggi-do (KR); Hyun-sik Han, Seoul (KR)

(73) Assignee: HEESUNG CATALYSTS CORPORATION, Gyeonggi-do (KR)

( * ) Notice: Subject to any disclaimer, the term of this patent is extended or adjusted under 35 U.S.C. 154(b) by 0 days.

(21) Appl. No.: 16/464,869

(22) PCT Filed: Nov. 29, 2017

(86) PCT No.: PCT/KR2017/013746
§ 371 (c)(1),
(2) Date: May 29, 2019

(87) PCT Pub. No.: WO2018/101718
PCT Pub. Date: Jun. 7, 2018

(65) Prior Publication Data
US 2019/0322537 A1  Oct. 24, 2019

(30) Foreign Application Priority Data
Dec. 2, 2016  (KR) .................. 10-2016-0163363

(51) Int. Cl.
*B01J 29/06*     (2006.01)
*C01B 39/08*     (2006.01)
*B01J 29/76*     (2006.01)
*B01J 35/04*     (2006.01)
*B01J 37/00*     (2006.01)
*B01J 37/08*     (2006.01)
*C01B 39/06*     (2006.01)
(Continued)

(52) U.S. Cl.
CPC ........... *C01B 39/085* (2013.01); *B01J 29/072* (2013.01); *B01J 29/76* (2013.01); *B01J 29/763* (2013.01); *B01J 35/0046* (2013.01); *B01J 35/0066* (2013.01); *B01J 35/04* (2013.01); *B01J 37/0009* (2013.01); *B01J 37/0018* (2013.01); *B01J 37/0036* (2013.01); *B01J 37/0045* (2013.01); *B01J 37/038* (2013.01); *B01J 37/04* (2013.01); *B01J 37/08* (2013.01); *C01B 39/06* (2013.01); *B01D 53/9418* (2013.01); *B01D 2255/20738* (2013.01); *B01D 2255/20761* (2013.01); *B01D 2255/50* (2013.01); *B01J 2229/18* (2013.01); *B01J 2229/183* (2013.01); *B01J 2229/186* (2013.01); *B01J 2229/30* (2013.01); *B01J 2229/42* (2013.01); *C01P 2002/72* (2013.01); *C01P 2002/80* (2013.01); *C01P 2004/03* (2013.01)

(58) Field of Classification Search
CPC ....... C01B 39/026; C01B 39/06; C01B 39/46; B01J 29/763; B01J 29/72; B01J 29/072; B01J 29/76; B01J 29/723; B01J 2229/18; B01J 2229/183; B01J 2229/186; B01J 2229/30; B01J 2229/42; B01J 35/0066; B01J 35/04; B01J 35/0046; B01J 37/0018; B01J 37/08; B01J 37/04; B01J 37/0045; B01J 37/0009; B01J 37/0036; B01J 37/038; B01D 53/9418; B01D 2255/20738; B01D 2255/20761; B01D 2255/50; C01P 2004/03; C01P 2002/72; C01P 2002/80
USPC ...... 502/60, 63, 64, 66, 69, 74, 85; 423/713, 423/718
See application file for complete search history.

(56) References Cited

U.S. PATENT DOCUMENTS 9,968,917 B2      5/2018  Naraki
2013/0108544 A1*  5/2013  Qi ......................... B01J 35/002
                                                    423/700
(Continued)

FOREIGN PATENT DOCUMENTS

JP    2007-222742 A    9/2007
KR    10-2009-0123920 A    12/2009
(Continued)

OTHER PUBLICATIONS

International Search Report and Written Opinion dated Mar. 15, 2018 by the International Searching Authority for Patent Application No. PCT/KR2017/013746, which was filed on Nov. 29, 2017 and published as WO 2018/101718 on Jun. 7, 2018 (Inventor—Kim et al.; Applicant—Heesung Catalysts Corporation) (Original—15 pages; Translation—10 pages).

*Primary Examiner* — Elizabeth D Wood
(74) *Attorney, Agent, or Firm* — Ballard Spahr LLP

(57) ABSTRACT

The present invention relates to zeolite containing Cu2+ (α) and Cu2+ (β) having different NO adsorption capacities loaded at a specific ratio, wherein the zeolite is chabazite (CHA)-type zeolite, particularly chabazite (CHA)-type zeolite loaded with divalent copper ions in which the NO adsorption area ratio of Cu2+ (α)/Cu2+ (β) after exposure to NO (nitrogen oxide) for 180 sec is 80% or more. In addition, the present invention relates to a method of preparing zeolite that is ion-exchanged in a slurry state and to a catalyst including the specified chabazite (CHA)-type zeolite.

7 Claims, 13 Drawing Sheets

(51) Int. Cl.
*B01J 29/072* (2006.01)
*B01J 35/00* (2006.01)
*B01J 37/03* (2006.01)
*B01J 37/04* (2006.01)
B01D 53/94 (2006.01)

(56) References Cited

U.S. PATENT DOCUMENTS

| | | | | |
|---|---|---|---|---|
| 2015/0151285 | A1* | 6/2015 | Rivas-Cardona | B01J 29/80 423/644 |
| 2015/0246345 | A1* | 9/2015 | Collier | B01J 29/76 423/700 |
| 2015/0246346 | A1* | 9/2015 | Chandler | B01J 29/072 502/74 |
| 2016/0082425 | A1* | 3/2016 | Matsuo | B01D 53/9418 502/74 |
| 2017/0007991 | A1* | 1/2017 | Bauer | B01J 29/005 |
| 2018/0207627 | A1* | 7/2018 | Bauer | B01D 53/9418 |

FOREIGN PATENT DOCUMENTS

| | | |
|---|---|---|
| KR | 10-2015-0072441 A | 6/2015 |
| KR | 10-2015-0128697 A | 11/2015 |
| KR | 10-2016-0020422 A | 2/2016 |
| KR | 10-2016-0163363 | 12/2016 |
| WO | WO-2008/106518 A2 | 9/2008 |
| WO | WO-2008/106519 A1 | 9/2008 |
| WO | WO-2008/106523 A2 | 9/2008 |
| WO | WO-2014/062949 A1 | 4/2014 |
| WO | WO-2014/160289 A1 | 10/2014 |
| WO | WO-2014/160292 A1 | 10/2014 |
| WO | WO-2014/160293 A1 | 10/2014 |
| WO | PCT/KR2017/013746 | 11/2017 |

\* cited by examiner

ZEOLITE HAVING SPECIFIC RATIO OF DIVALENT COPPER IONS SUPPORTED THEREON, AND PREPARATION METHOD THEREFOR AND CATALYST COMPOSITION COMPRISING SAME

CROSS-REFERENCE TO RELATED APPLICATIONS

This application is a U.S. National Phase Application of International Application No. PCT/KR2017/013746, filed Nov. 29, 2017, which claims priority to Korean Application No. 10-2016-0163363, filed Dec. 2, 2016, each of which are hereby incorporated by reference in their entirety.

TECHNICAL FIELD

The present invention relates to zeolite containing divalent copper ions loaded at a specific ratio, a method of preparing the same, and a catalyst composition including the same, and more particularly, to a selective NOx reduction catalyst composition.

BACKGROUND ART

Chabazite-type zeolite, which is a selective NOx reduction catalyst provided in an exhaust gas treatment system, is a catalyst component used for reduction and removal of nitrogen oxide in automobile exhaust gas in the presence of an $NH_3$ reducing agent. A hybrid selective reduction catalyst, disclosed in Korean Patent Application Publication No. 2014-0131401 by the present applicant, is provided in the form of a hybrid SCR catalyst having a double-layer structure in which a $V_2O_5/TiO_2$ layer is formed at an upper layer or a lower layer and a zeolite layer impregnated with a metal (Cu or Fe) is formed at a lower layer or an upper layer, or in the form of a hybrid SCR catalyst having a single-layer structure in which $V_2O_5/TiO_2$ and metal-impregnated zeolite are mixed. Furthermore, the above patent pertains to an SCR catalyst having improved ammonia occlusion capacity that is able to efficiently convert NOx to harmless substances in the acceleration/deceleration section of a diesel engine and to an exhaust gas discharge device using the same, in which diesel engine exhaust gas purification capability, particularly nitrogen oxide purification capability at low temperatures, is increased. Zeolite impregnated with a metal, especially Cu (hereinafter referred to as Cu-zeolite), rather than the hybrid catalyst, may be used alone as a NOx reduction catalyst.

Meanwhile, in order to apply Cu-zeolite as a NOx reduction catalyst for a vehicle, the zeolite catalyst composition is typically applied onto the inner walls of a honeycomb carrier. Briefly describing the overall process of preparing the catalyst composition, Cu-zeolite is purchased from a commercial source, mixed with deionized water, a binder and an additive, and dispersed to afford a Cu-zeolite catalyst composition, which is then applied on a carrier, dried and calcined, thereby completing a catalyst structure. Cu-zeolite, which is purchased from a commercial source, is typically prepared through liquid-phase ion exchange (hereinafter referred to as LPIE), and is specifically prepared by subjecting ammonium zeolite and a copper precursor to ion exchange by adjusting the temperature and acidity, followed by filtration, washing and drying, which is a method known in the art.

DISCLOSURE

Technical Problem

However, in the case of adjusting the amount of copper that is loaded in the catalyst composition, the problem of such diversity cannot be solved with commercially available Cu-zeolite. Meanwhile, the process of preparing a Cu-zeolite catalyst composition, in which Cu-zeolite is directly synthesized through liquid-phase ion exchange, rather than purchased, followed by mixing with deionized water, a binder and an additive and then dispersion as described above, is complicated, takes a long time, and increases manufacturing costs. Above all, there is a problem in that NOx high-temperature activity is lowered upon the preparation of a NOx reduction catalyst using Cu-zeolite that is prepared through conventional liquid-phase ion exchange or purchased.

Technical Solution

With the goal of solving these problems, the present inventors have prepared Cu-zeolite using a novel process, not LPIE. The present inventors have prepared Cu-zeolite having a novel structure through a so-called in-slurry ion exchange (hereinafter referred to as ISIE) process. Unlike Cu-zeolite prepared through LPIE, the present inventors have ascertained that Cu-zeolite prepared through ISIE according to the present invention is configured such that Cu is selectively ion-exchanged at specific positions in the zeolite pores and is thus structurally differentiated from conventional zeolites. In chabazite (CHA)-type zeolite, $Cu^{2+}$ ion-exchanged within small pores comprising 6 oxygen rings and $Cu^{2+}$ ion-exchanged within large pores comprising 8 oxygen rings are represented as $Cu^{2+}$ (α) and $Cu^{2+}$ (β), respectively. Since NO (nitrogen monoxide) adsorbed to $Cu^{2+}$ (α) and $Cu^{2+}$ (β) shows DRIFTS (Diffuse Reflectance Infrared Fourier Transform Spectroscopy) absorption bands at different positions, the $Cu^{2+}$ (α)/$Cu^{2+}$ (β) ratio may be calculated accurately, and the structures thereof may be distinguished from each other. Therefore, Cu-zeolite was specified using, as a parameter, the NO adsorption ratio depending on the $Cu^{2+}$ position. The present inventors adopted a spectral area ratio of $Cu^{2+}$ (α)/$Cu^{2+}$ (β) of the catalyst composition after exposure to NO (nitrogen monoxide) for 180 sec, as a new parameter. Chabazite (CHA)-type zeolite loaded with two or more copper ions in which the area ratio of $Cu^{2+}$ (α)/$Cu^{2+}$ (β) after exposure to NO for 180 sec is 80% or more is prepared through ISIE, and the preparation of the catalyst using CHA zeolite having the above novel structure is capable of achieving excellent high-temperature activity.

Advantageous Effects

According to the present invention, zeolite containing divalent copper ions loaded at a specific ratio determined as a parameter is vastly superior in nitrogen oxide (NOx) purification activity at high temperatures, compared to conventional chabazite-type zeolite catalysts in which the adsorption ratio of $Cu^{2+}$ (α)/$Cu^{2+}$ (β) after exposure to NO for 180 sec is less than 80%. Moreover, ISIE confers a simple and rapid way to exchange copper ions in zeolite and facilitates control of the amount of copper that is loaded.

MODE FOR INVENTION

As used herein, the term "catalyst" or "catalyst structure" refers to a structure configured such that a catalyst composition including zeolite is applied to the inside of a typical honeycomb carrier or support. As is apparent by those skilled in the art, the carrier or support may indicate a structure, which may be made of an inorganic material or a metal and in which multiple passages are defined by multiple inner walls and the catalyst composition is applied on some or all of the inner walls. The catalyst structure is distinguished from what is meant by the term "catalyst composition", and the catalyst composition is also distinguished from zeolite, which is a component thereof. Herein, the catalyst composition should be understood to include zeolite and a binder or an additive, such as an alkali metal or an alkaline earth metal, required for application onto the catalyst structure. In the present invention, "zeolite" means a structure in which a tetrahedron of $(Si,Al)O_4$ has a three-dimensional skeleton and cavities due to the presence of apical oxygen, as will be easily understood by those skilled in the art, but in particular, chabazite-type zeolite having a $SiO_2/Al_2O_3$ molar ratio of 5 to 50 is described as an example.

Figure 1:
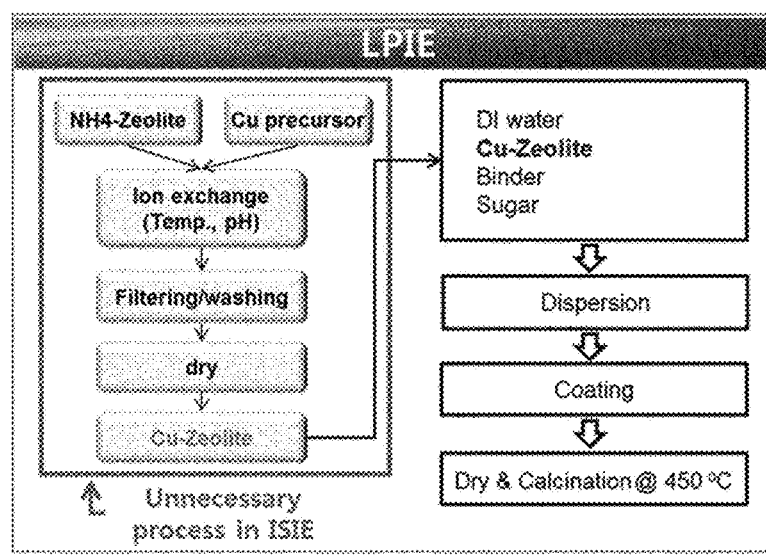
FIG. 1 schematically shows the overall process of preparing a conventional catalyst structure.

As copper-ion-exchanged chabazite-type zeolite, Cu-zeolite having a $SiO_2/Al_2O_3$ molar ratio of 30 and an average particle diameter of 1.5 µm or more is known in the art. Cu-zeolite available from a commercial source is prepared through known LPIE. By catalyst manufacturers, a catalyst structure is manufactured in a manner in which commercially available Cu-zeolite is purchased, mixed with deionized water (DI water), a binder such as alumina, silica or zirconia, and an additive, and dispersed, thus preparing a Cu-zeolite catalyst composition, which is then applied on a honeycomb carrier, followed by drying and calcination. Here, the additive includes an alkali metal, an alkaline earth metal, a sugar or the like, which is known in the art. The completed honeycomb catalyst structure is attached to a vehicle engine exhaust system to reduce nitrogen oxides discharged from the engine to harmless substances. FIG. 1 schematically illustrates the overall process of preparing a conventional catalyst structure. However, the amount of copper that is loaded needs to be varied in order for catalyst manufacturers to prepare various catalyst compositions, which are applied on the carrier, and moreover, and the preparation of a NOx reduction catalyst using Cu-zeolite that is obtained through conventional LPIE and is commercially available is problematic because NOx activity at high temperatures is low, and thus a novel method of preparing a catalyst composition, aiming at enabling variation in the amount of copper that is loaded, cost reduction and excellent high-temperature activity, is recognized as a challenging task.

Figure 2:
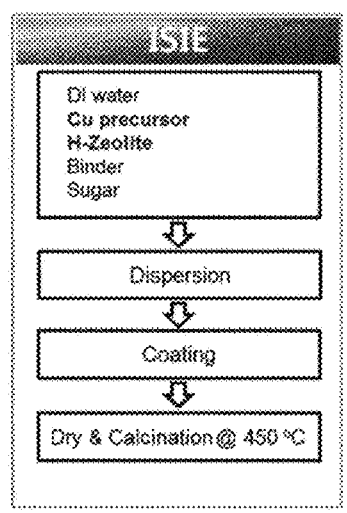
FIG. 2 schematically shows the overall process of preparing a catalyst structure according to the present invention.
Figure 3A:
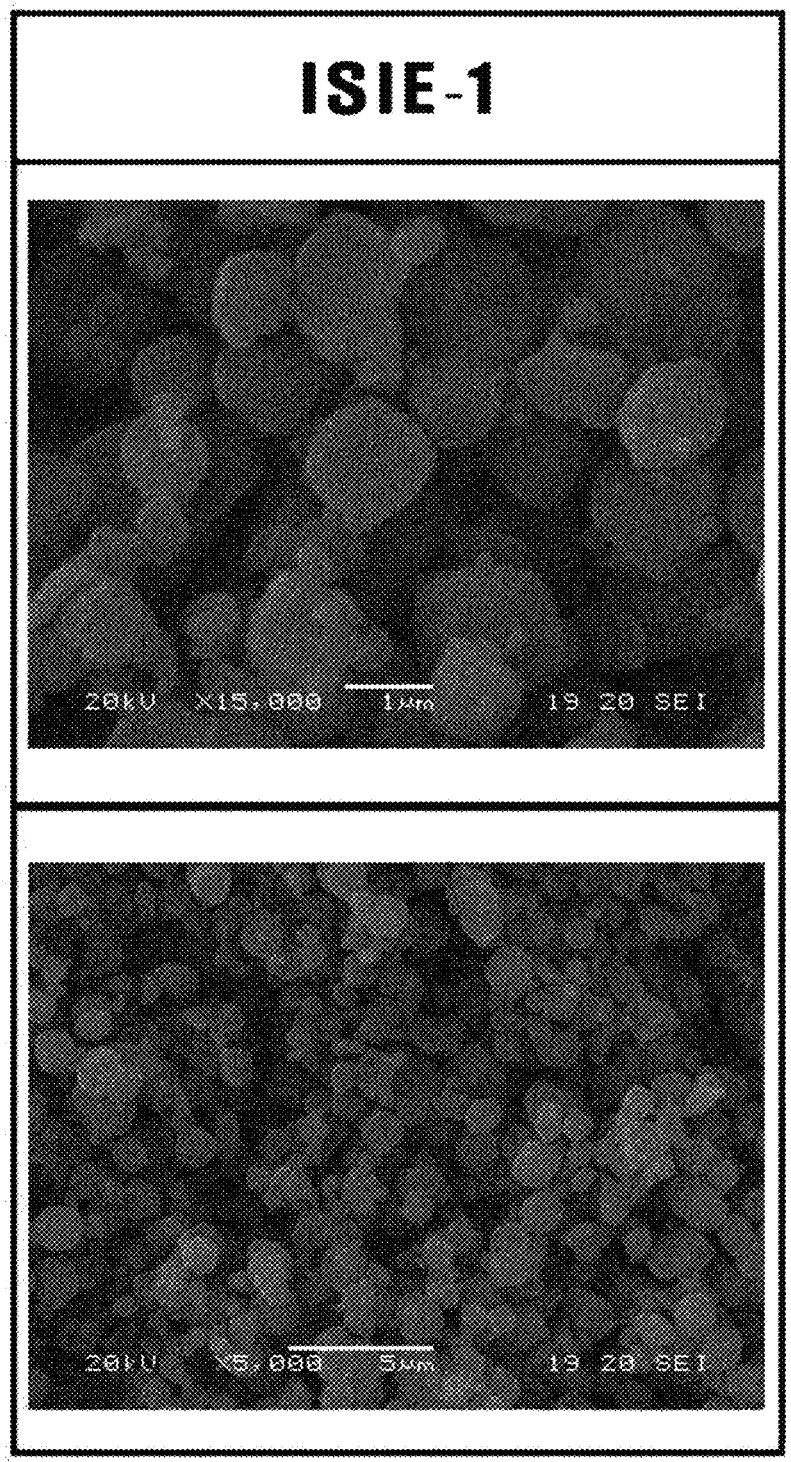
FIG. 3 shows scanning electron microscope (SEM) images of two zeolites obtained through ISIE according to the present invention and two zeolites obtained through conventional LPIE.
Figure 3B:
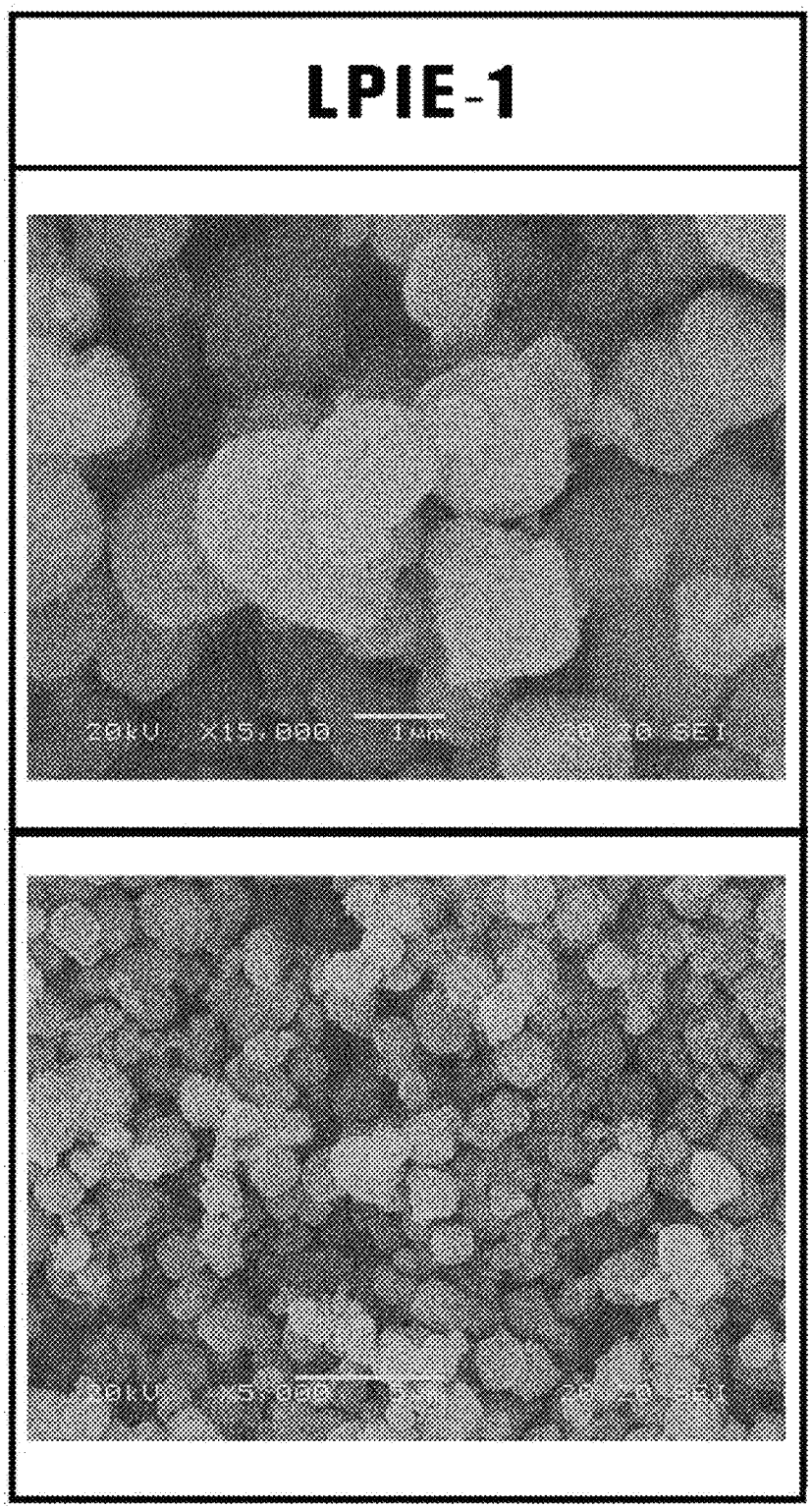
Figure 3C:
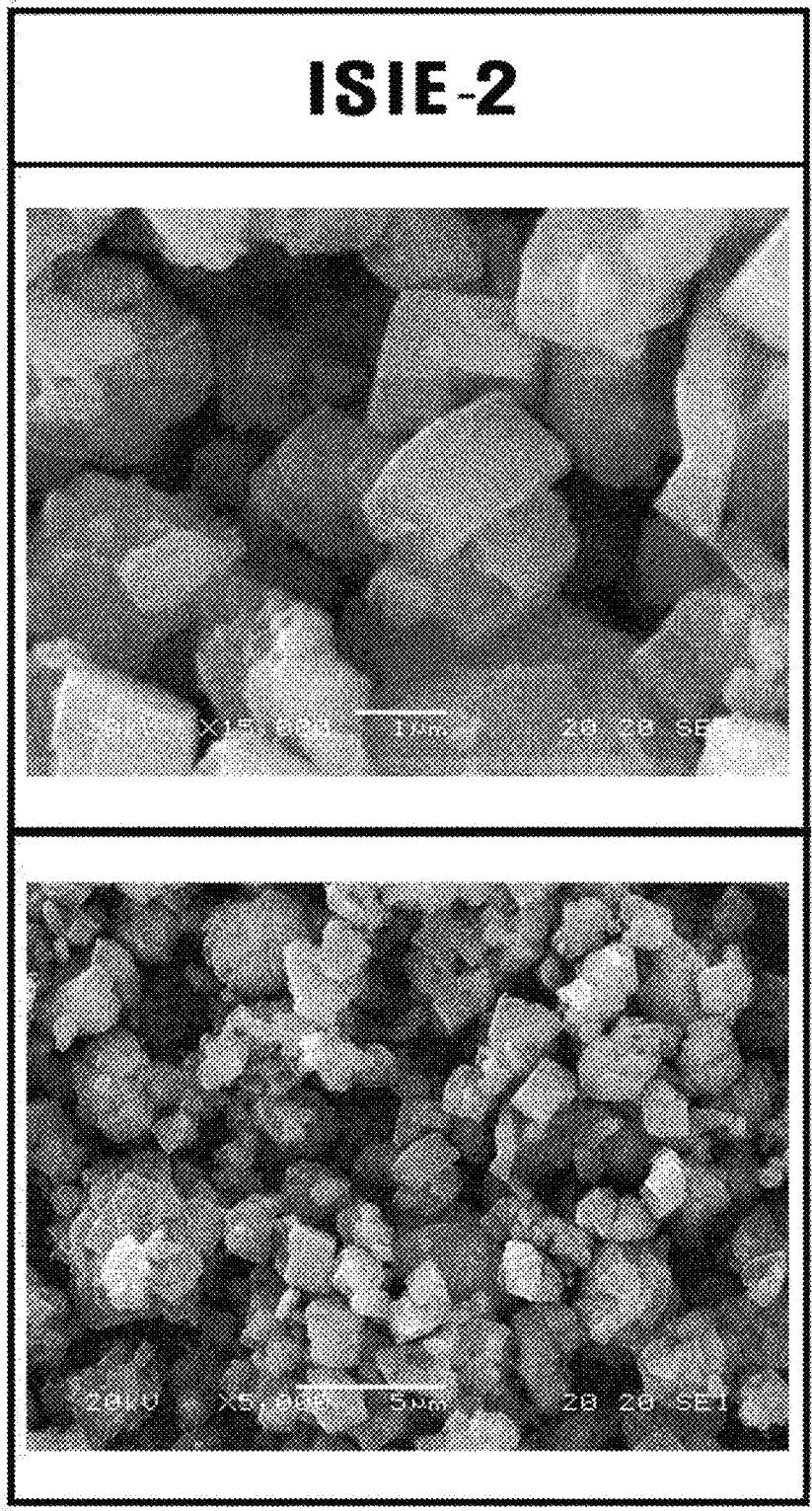
Figure 3D:
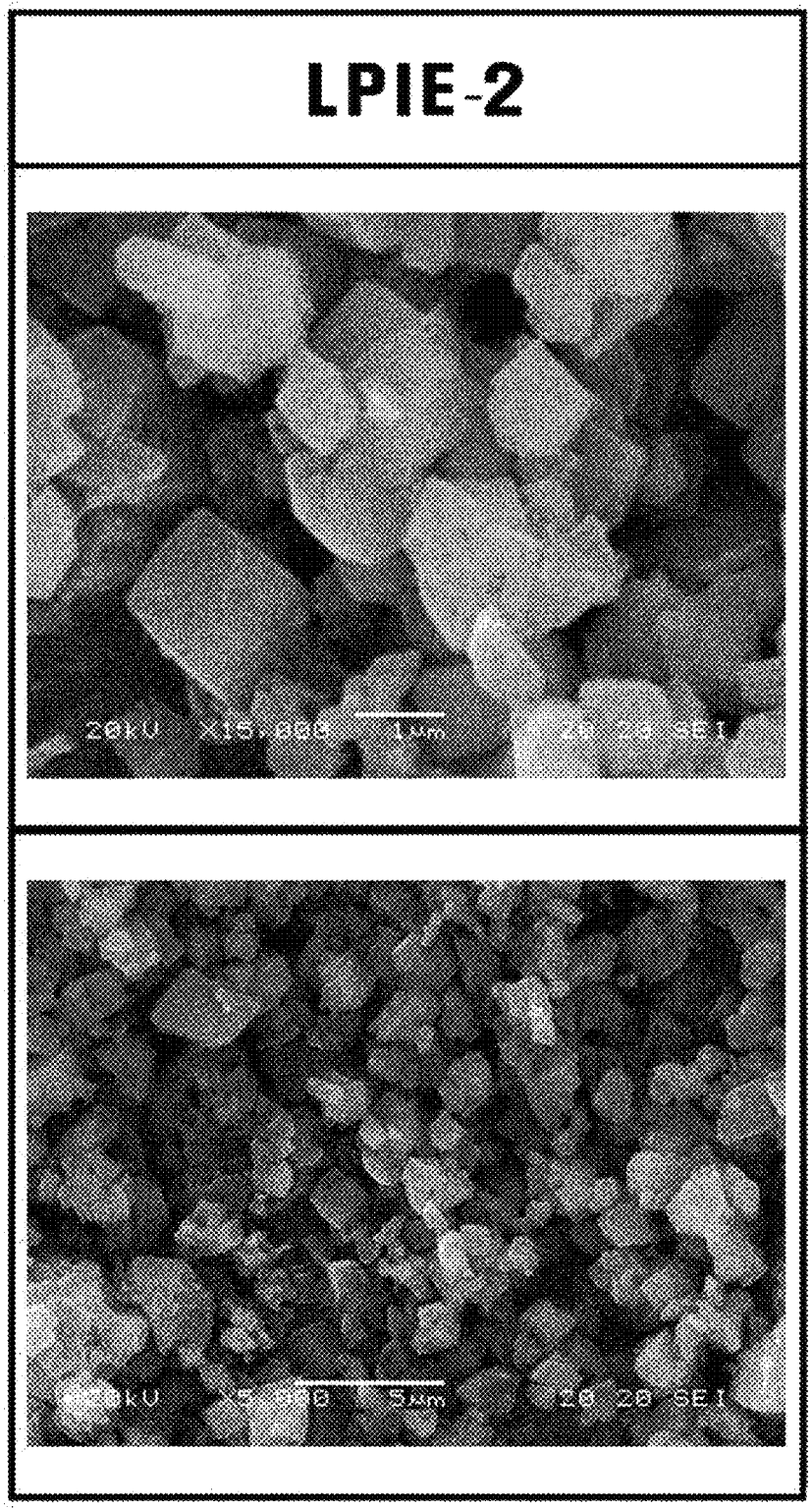

The present inventors have prepared Cu-zeolite having a novel structure through a novel process called ISIE and a catalyst composition using the same. Compared to conventional Cu-zeolite obtained through LPIE, zeolite prepared through ISIE is very similar in terms of structure (SEM image), crystal structure (XRD pattern) and other properties ($H_2$-TPR and $NH_3$-TPD), but is different in the oxidation state of the ion-exchanged metal and the position thereof in zeolite pores, and thus the high-temperature activity of the catalyst according to the present invention can be confirmed to increase based on these parameter differences. FIG. 2 schematically illustrates the overall process of preparing a catalyst structure according to the present invention.

ISIE, which is a one-pot process used for the preparation of zeolite in the present invention, is different from conventional LPIE in that it obviates washing and filtration in the preparation of metal-impregnated zeolite. In LPIE, a soluble, especially water-soluble, Cu precursor, and ammonium zeolite are adjusted in temperature and acidity in a liquid phase, pretreated, washed and then filtered and thus copper-ion-exchanged, but in ISIE, a Cu precursor, preferably insoluble CuO, and H-zeolite are subjected to ion exchange through contact and milling in a slurry state, and thus ISIE is understood to be a process that obviates additional washing and filtration. Specifically, DI water is added with CuO, H-zeolite and a binder, for example, a Zr material, stirred at room temperature for 10 min or more, milled, further added with an additive, and dispersed to afford a Cu-zeolite catalyst composition, which is then applied on a honeycomb carrier, followed by drying and calcination, thereby preparing a catalyst structure. Although not particularly limited in theory, CuO is deemed to undergo slow copper ionization through slurry milling and to be transferred to the proper position in zeolite. The zeolite prepared through ISIE according to the present invention is compared with the conventional zeolite prepared through LPIE. FIG. 3 shows SEM images of two zeolite samples obtained through ISIE and two zeolite samples obtained through LPIE.

The Case-1 sample is zeolite that has a $SiO_2/Al_2O_3$ molar ratio of 30 and in which 3 wt % of CuO is loaded based on the total weight thereof, and the Case-2 sample is zeolite that has a $SiO_2/Al_2O_3$ molar ratio of 5 and in which 2.5 wt % of CuO is loaded based on the total weight thereof and potassium and calcium oxides are contained as additives in amounts of 1 to 5 wt %. As shown in FIG. 3, the morphological structures of zeolites obtained through ISIE and LPIE are almost the same as each other.

Figure 4:
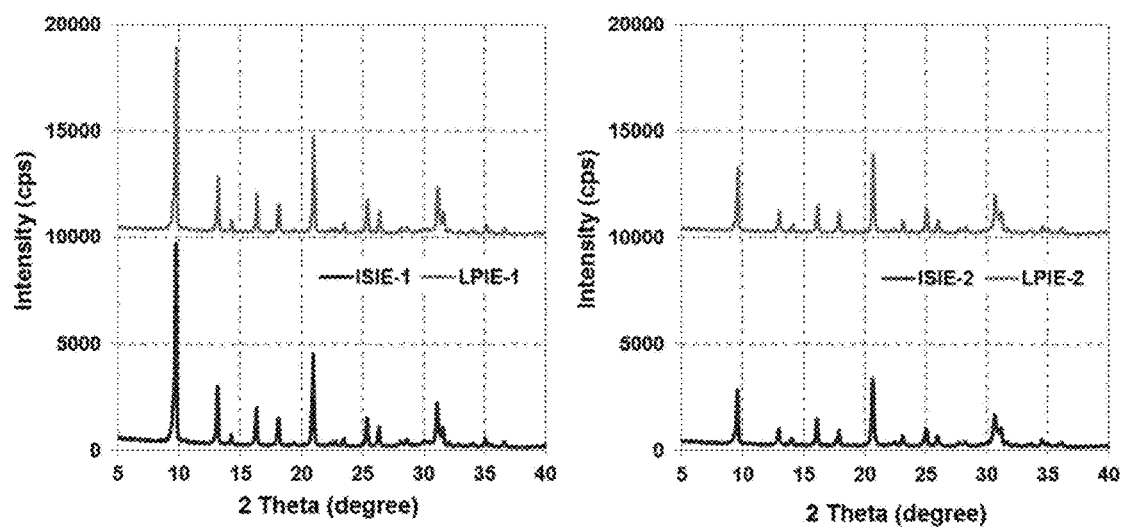
FIG. 4 shows the XRD patterns of the two samples of FIG. 3.

In the present invention, the crystal structures of zeolites obtained through ISIE and LPIE are compared. FIG. 4 shows the XRD patterns of the two samples of FIG. 3.

As shown in FIG. 4, the crystal structures of zeolites obtained through ISIE and LPIE are almost the same as each other. In the present invention, various properties were measured in order to structurally distinguish the zeolites obtained through ISIE and LPIE, and specifically, the $H_2$-TPR profiles and $NH_3$-TPD profiles of the zeolites hydrothermally aged at 750° C. for 20 hr are almost the same as each other (profiles are not shown).

However, as will be described below, the zeolite prepared in the present invention is different in terms of NOx reduction, in particular NOx reduction activity at high temperatures, from conventional zeolite, and thus the present inventors have sought to determine the parameters that distinguish them structurally.

Figure 5:
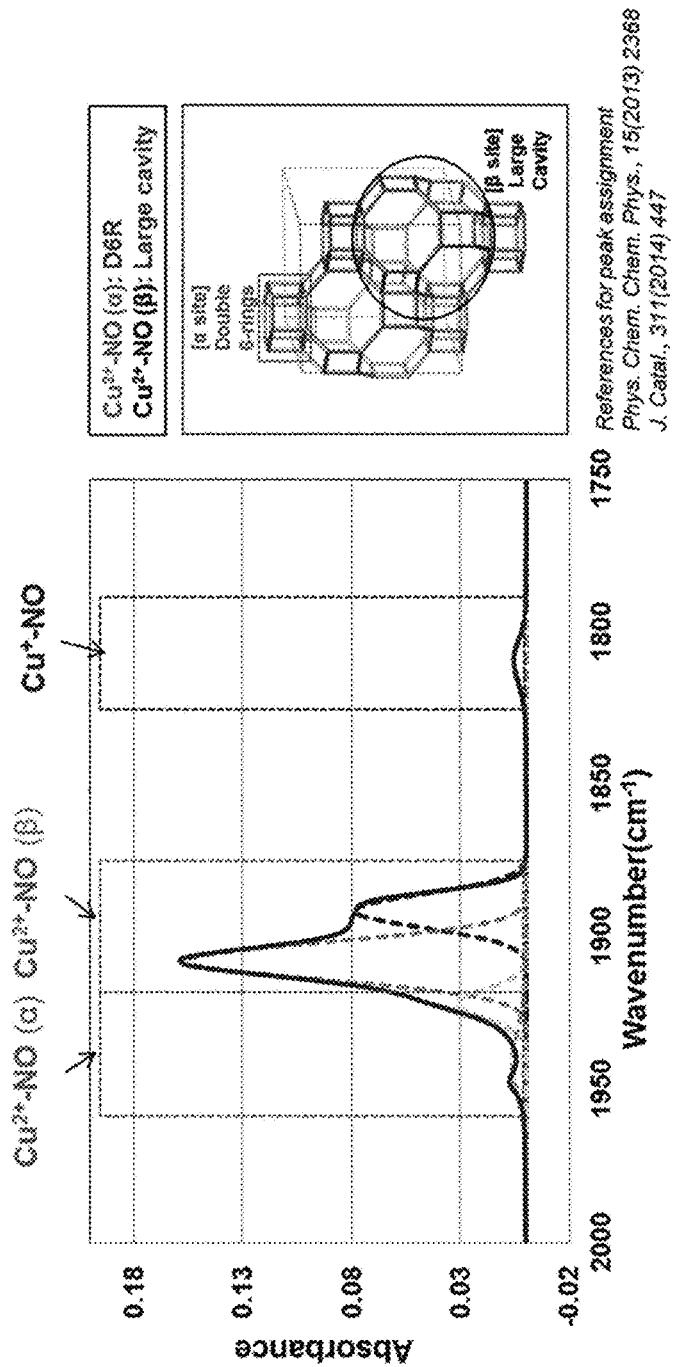
FIG. 5 shows the spectrum results obtained through NO DRIFTS, which is a spectroscopic process for measuring a NO adsorption rate, and a chabazite-type (CHA) zeolite structure.
Figure 6:
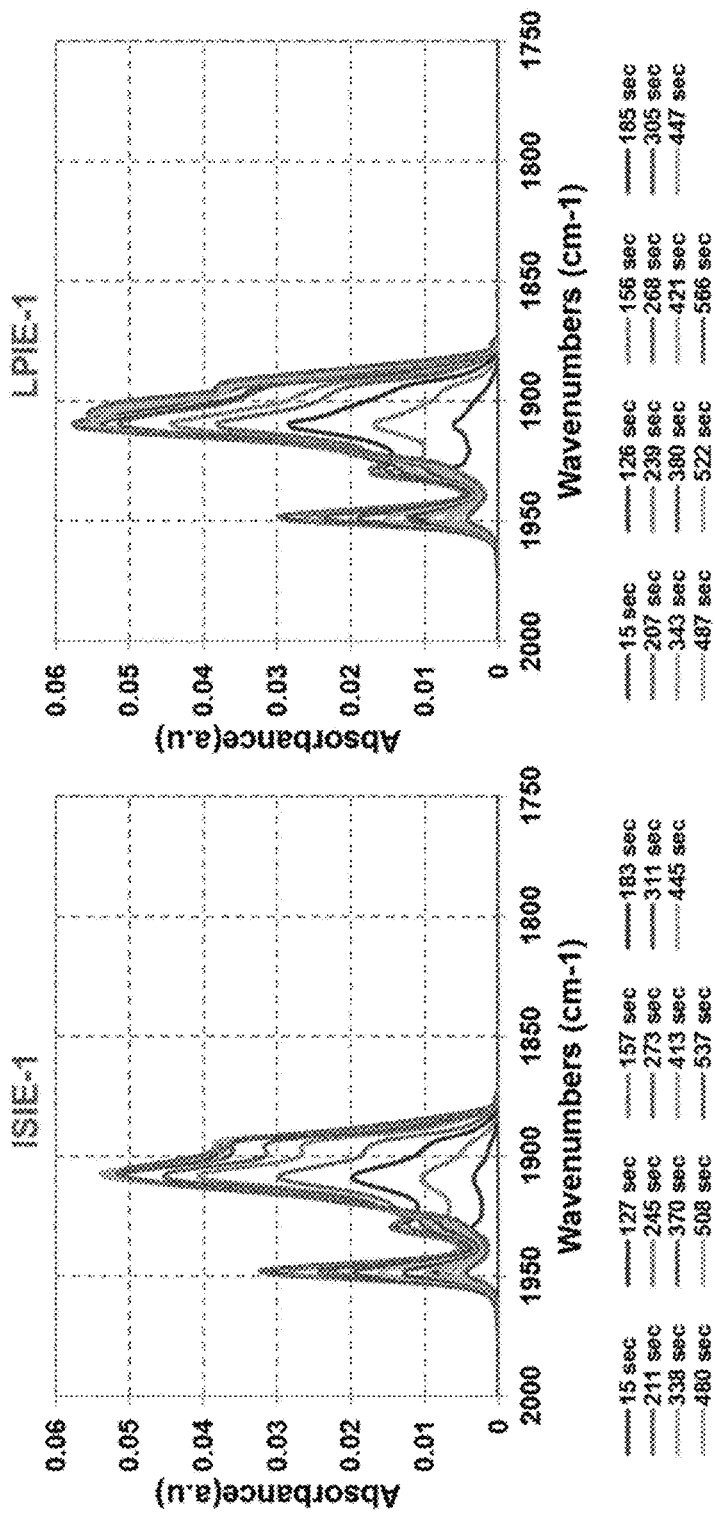
FIG. 6 shows peak changes depending on the NO exposure time (ranging from 15 sec to 537 sec) in NO DRIFTS.

As disclosed in documents, two divalent copper ions are known to be present depending on the NO adsorption capacity. FIG. 5 shows spectrum results obtained through NO DRIFT spectroscopy for measuring the NO adsorption rate, and the chabazite (CHA)-type zeolite structure. With reference to the documents, CHA is configured such that the α-type divalent copper ion $Cu^{2+}$ (α) is exchanged in the double 6-ring region and the β-type divalent copper ion $Cu^{2+}$ (β) is present in large cavities. The present inventors have investigated whether the presence or content of such divalent copper ions may be utilized as a parameter to specify the zeolites produced through ISIE and LPIE. FIG. 6 shows peak changes depending on the NO exposure time (ranging from 15 sec to 537 sec) in NO DRIFTS, which may be implemented by those skilled in the art. The zeolite sample was calcined at 450° C. in a $N_2$ atmosphere, cooled to 40° C., and exposed to a 5% $NO/N_2$ atmosphere.

Figure 7:
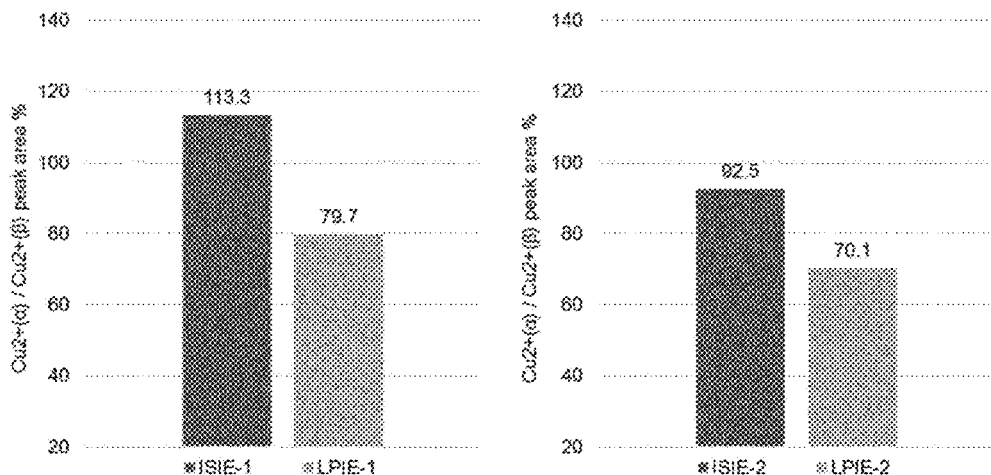
FIG. 7 shows the results of NO adsorption rates of the zeolite samples prepared through ISIE and LPIE.

As shown in FIG. 6, the NO adsorption rate of $Cu^{2+}$ (α) is decreased and the NO adsorption rate of $Cu^{2+}$ (β) is increased over time. Through such NO DRIFT measurement, the Cu-zeolite of the present invention was specified to have a ratio of ions having different states, as a parameter, to distinguish Cu-zeolite prepared through ISIE according to the present invention. As a new parameter, the present inventors adopted the adsorption ratio of $Cu^{2+}$ (α)/$Cu^{2+}$ (β) of the catalyst composition after exposure to NO (nitrogen monoxide) for 180 sec. FIG. 7 shows the results of adsorption rates of the Case-1 and Case-2 zeolite samples.

With reference to FIG. 7, the chabazite (CHA)-type zeolite according to the present invention is chabazite (CHA)-type zeolite loaded with copper ions in which the adsorption rate or adsorption area ratio of $Cu^{2+}$ (α)/$Cu^{2+}$ (β) after exposure to NO for 180 sec is 80% or more. This is structurally and functionally differentiated from chabazite (CHA)-type zeolite prepared by LPIE, loaded with divalent copper ions in which the adsorption area ratio of $Cu^{2+}$ (α)/$Cu^{2+}$ (β) is less than 80%.

Below is a description of the method of preparing the catalyst composition schematically shown in FIG. 2. Specifically, H-zeolite may be purchased or synthesized. As understood by those skilled in the art, H-zeolite, especially chabazite-type zeolite, may be prepared using a material composition comprising a silica material, an alumina material, and water. Also, the material composition may be added with a component that is able to promote the crystallization of seed crystals. Examples of the silica material preferably include colloidal silica, amorphous silica, sodium silicate, tetraethyl ortho-silicate, and aluminosilicate gel. Examples of the alumina material preferably include aluminum sulfate, sodium aluminate, aluminum hydroxide, aluminum chloride, aluminosilicate gel, and metal aluminum. As a structure-directing agent, N,N,N-trialkyl adamantane ammonium hydroxide is used.

It is preferred that these materials be mixed to afford the material composition for chabazite-type zeolite. In the material composition, the $SiO_2/Al_2O_3$ molar ratio preferably falls in the range of 16 to 100. Given the molar ratio of the material composition ranging from 16 to 100, it is easy to obtain chabazite-type zeolite having a $SiO_2/Al_2O_3$ molar ratio of 5 to 50. The material composition comprising water, the silica material, the alumina material, and the structure-directing agent is preferably crystallized in a sealed pressure vessel at a temperature between 100 and 200° C. for a sufficient period of time, thus obtaining chabazite-type zeolite. The chabazite-type zeolite thus obtained is configured such that one or both of the structure-directing agent and the alkali metal may be contained in the pores thereof. Hence, these are preferably removed as necessary. The removal of alkali metal, etc. may be performed through exchange treatment using an acidic solution, pyrolysis or appropriate combination thereof, thereby preparing H-zeolite. In the preparation method, chabazite-type zeolite is provided by way of example, and 8-membered oxygen-ring small-pore zeolite, for example, LTA, AEI, AFT, AFV, AFX, KFI, SAV, SFW, TSC, FAU, MFI, BEA, FER, or MOR, may be applied.

Figure 8:
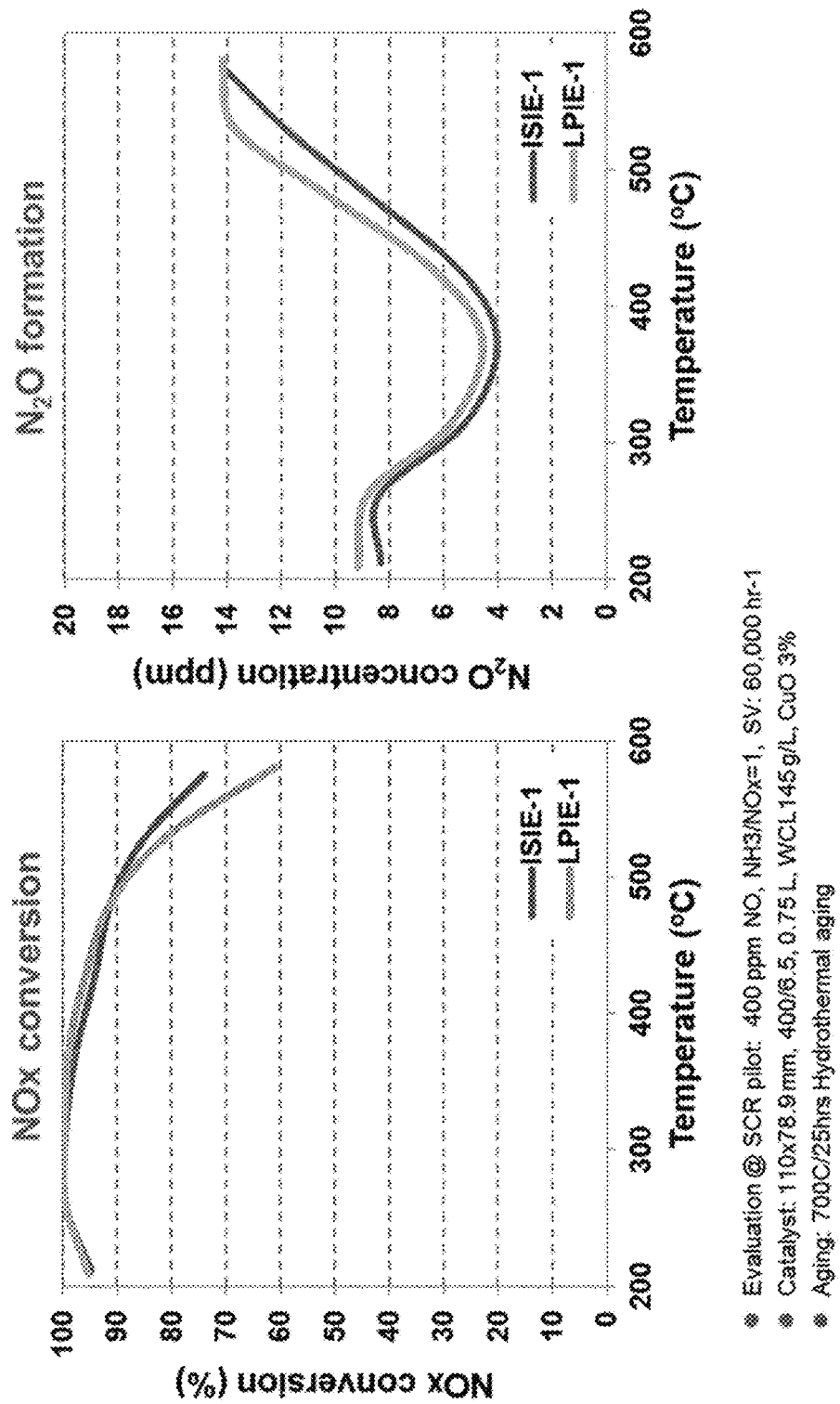
FIG. 8 is graphs showing the NOx conversion performance using Case-1 catalysts.
Figure 9:
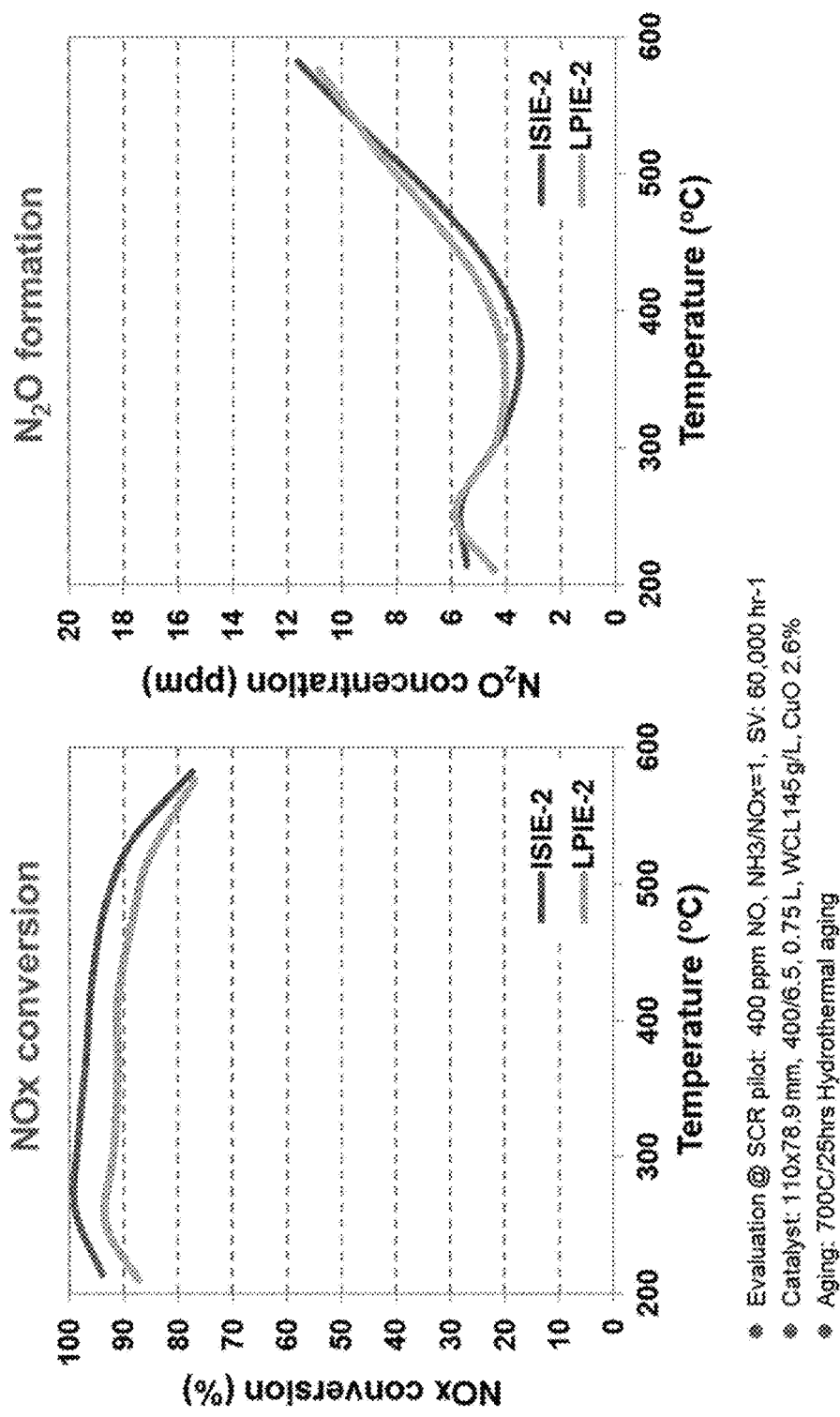
FIG. 9 is graphs showing the NOx conversion performance using Case-2 catalysts.

The H-zeolite synthesized above or commercially purchased is mixed with a Cu precursor such as CuO, a binder such as Zr acetate, and an additive, and is dispersed, thus preparing a Cu-zeolite catalyst composition. As the Cu precursor, copper acetate, copper nitrate, or copper sulfate may be used. CuO is understood to be ion-exchanged through contact and milling in a slurry state with the H-zeolite. DI water is added with CuO, H-zeolite and Zr acetate, stirred at room temperature for 10 min or more, and then milled. Also, the additive is added thereto and dispersed, thus preparing a Cu-zeolite catalyst composition in a slurry state, which is then applied on the inner walls of a honeycomb carrier, understood by those skilled in the art, dried and calcined at 450° C., resulting in a catalyst structure. In the present invention, the additive may include an alkali metal, an alkaline earth metal, a sugar or the like, which is known in the art. In an embodiment of the present invention, as described above, the Case-1 sample is a catalyst composition including zeolite having a $SiO_2/Al_2O_3$ molar ratio of 30 and loaded with 3 wt % of CuO based on the total weight thereof, and the Case-2 sample is a catalyst composition including zeolite having a $SiO_2/Al_2O_3$ molar ratio of 5 and loaded with 2.6 wt % of CuO based on the total weight thereof and added with 1 to 5 wt % of potassium and calcium oxides as additives. The completed honeycomb catalyst structure is attached to a vehicle engine exhaust system to reduce nitrogen oxides into harmless substances. FIG. 8 is graphs showing the performance using the Case-1 catalysts. As shown in FIG. 8, compared to the conventional catalyst including zeolite prepared through LPIE, the catalyst prepared according to the present invention is characterized in that a high NOx conversion rate is maintained at high temperatures and $N_2O$ is formed in a small amount in the overall temperature range. Also, FIG. 9 is graphs showing the performance using the Case-2 catalysts. As shown in FIG. 9, compared to the conventional catalyst including zeolite prepared through LPIE, the catalyst having a low $SiO_2/Al_2O_3$ ratio prepared according to the present invention is characterized in that a high NOx conversion rate is maintained in the overall temperature range and in that $N_2O$ formation is low at 250 to 550° C.

Figure 10:
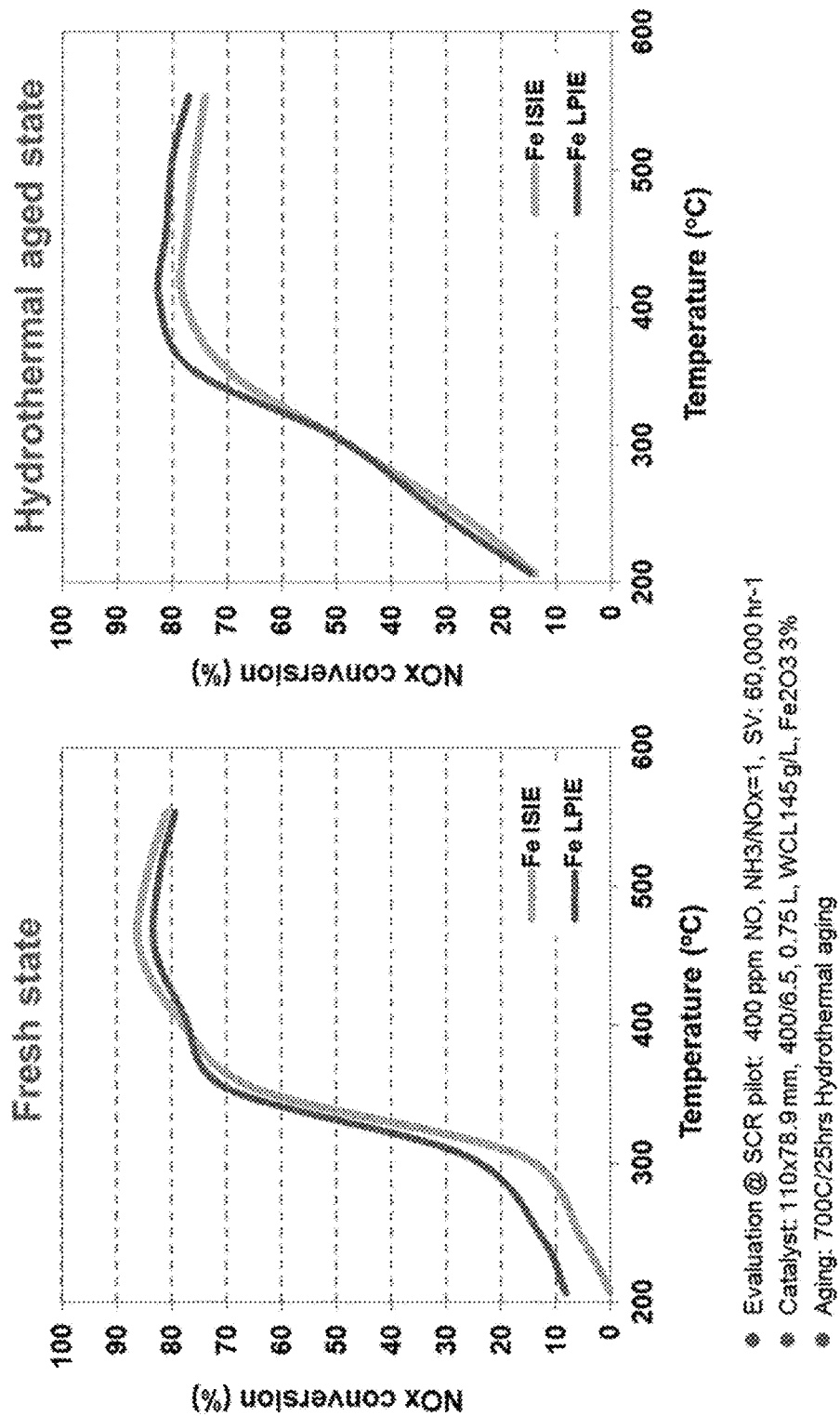
FIG. 10 is graphs showing the results of comparison of activity before and after hydrothermal aging of Fe-zeolite catalysts prepared through ISIE and LPIE.

Moreover, an embodiment in which Fe is exchanged in lieu of Cu was performed in the same manner as above. The results are shown in FIG. 10. As shown in this drawing, the activities before and after hydrothermal aging of the Fe-zeolite catalysts prepared through ISIE and LPIE were similar to each other, from which the ISIE process can be confirmed to be applicable even upon Fe ion exchange.

The invention claimed is:

1. An SCR catalyst composition, comprising a chabazite (CHA)-type zeolite and a binder, wherein the chabazite (CHA)-type zeolite is loaded with copper ions in which a NO adsorption area of $Cu^{2+}$ ($\alpha$) is 80% or more as compared to a NO adsorption area of $Cu^{2+}$ ($\beta$) after exposure to NO for 180 sec in a NO DRIFTS spectrum.

2. The catalyst composition of claim 1, wherein the binder is zirconium acetate.

3. The catalyst composition of claim 1, further comprising an alkali metal and/or an alkaline earth metal.

4. The catalyst composition of claim 3, wherein the alkali metal is potassium and the alkaline earth metal is calcium.

5. A honeycomb SCR catalyst structure coated with the catalyst composition of claim 1.

6. A method of preparing the SCR catalyst composition of claim 1, the method comprising preparing a zeolite slurry by dispersing a copper precursor and chabazite (CHA)-type zeolite in a slurry state and drying and calcining the zeolite slurry.

7. The method of claim 6, wherein the copper precursor is copper oxide, copper nitrate, copper sulfate, or copper acetate.

\* \* \* \* \*